United States Patent
Clark

(10) Patent No.: US 7,717,594 B2
(45) Date of Patent: May 18, 2010

(54) COMPACT ILLUMINATION DEVICE

(75) Inventor: Roy Clark, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 11/762,979

(22) Filed: Jun. 14, 2007

(65) Prior Publication Data

US 2008/0310177 A1   Dec. 18, 2008

(51) Int. Cl.
*B64D 47/02* (2006.01)
(52) U.S. Cl. .................. 362/471; 362/328; 362/470
(58) Field of Classification Search .............. 362/147, 362/243, 245, 327, 328, 339, 470, 471, 479, 362/484, 490, 800; 244/118.1
See application file for complete search history.

(56) References Cited

U.S. PATENT DOCUMENTS

| | | | |
|---|---|---|---|
| 3,358,134 A | 12/1967 | Gonyea | |
| 4,313,208 A | 1/1982 | Kavenik | |
| 5,108,048 A | 4/1992 | Chang | |
| 5,129,597 A * | 7/1992 | Manthey et al. | 362/484 |
| 5,395,074 A | 3/1995 | Hart | |
| 5,601,034 A | 2/1997 | Tao | |
| 5,921,670 A * | 7/1999 | Schumacher et al. | 362/471 |
| 6,139,166 A | 10/2000 | Marshall | |
| 6,607,286 B2 | 8/2003 | West | |
| 6,609,813 B1 | 8/2003 | Showers | |
| 6,814,470 B2 | 11/2004 | Rizkin | |
| 6,819,506 B1 | 11/2004 | Taylor | |
| 6,846,099 B2 * | 1/2005 | Dubin et al. | 362/470 |
| 6,871,981 B2 | 3/2005 | Alexanderson | |
| 6,896,381 B2 | 5/2005 | Benitez | |
| 6,899,443 B2 | 5/2005 | Rizkin | |
| 6,924,943 B2 | 8/2005 | Minano | |
| 6,988,815 B1 | 1/2006 | Rizkin | |
| 6,993,242 B2 | 1/2006 | Holman | |
| 7,006,306 B2 | 2/2006 | Falicoff | |
| 7,021,797 B2 | 4/2006 | Minano | |

(Continued)

FOREIGN PATENT DOCUMENTS

JP        62129944 A   *  6/1987

OTHER PUBLICATIONS

Robert P. Friedman, Optical Designs for ultrahigh-flux infrared and solar energy collection: monolithic and dielectric tailored edge-ray concentrators, Applied Optics, pp. 6684-6691, Dec. 1, 1996, vol. 35, No. 34, Optical Society of America.

(Continued)

*Primary Examiner*—Y My Quach Lee
(74) *Attorney, Agent, or Firm*—Ostrager Chong Flaherty & Broitman P.C.

(57) ABSTRACT

Compact illumination systems, particularly for aircraft, use efficient beam forming optical light emitting diode arrangements combined with beam turning and beam splitting prism optics and optional aspheric reflectors to direct light in a cross cabin or cross bin lighting application. The LED based compact illumination devices are positioned to shine on opposite storage/stowage bins without being directly visible to a passenger. The devices are effective for illuminating ceiling structures as well as across the aisles of a passenger cabin, thus creating a cross-bin lighting system.

15 Claims, 11 Drawing Sheets

U.S. PATENT DOCUMENTS

| | | |
|---|---|---|
| 7,031,063 B2 | 4/2006 | Peterson |
| 7,042,655 B2 | 5/2006 | Sun |
| 7,059,731 B2 | 6/2006 | Lee |
| 7,063,440 B2 | 6/2006 | Mohacsi |
| 7,070,281 B2 | 7/2006 | Kato |
| 7,083,297 B2 | 8/2006 | Matthews |
| 7,114,827 B2 | 10/2006 | Halter |
| 7,148,632 B2 | 12/2006 | Berman |
| 2005/0002198 A1 | 1/2005 | Blechschmidt |
| 2006/0006821 A1 | 1/2006 | Singer |
| 2007/0053188 A1 | 3/2007 | New |
| 2007/0109802 A1 | 5/2007 | Bryan |
| 2008/0001557 A1 | 1/2008 | Dardis |

OTHER PUBLICATIONS

W. T. Welford, High Collection Nonimaging Optics, pp. 22-29, 1989, Academic Press, Inc., San Diego, California.

U.S. Appl. No. 11/760,386 to Roy Clark, filed Jun. 8, 2007.

* cited by examiner

COMPACT ILLUMINATION DEVICE

TECHNICAL FIELD

The disclosure relates to interior illumination systems for aircraft, particularly interior illumination and lighting systems for passenger cabins in commercial passenger airplanes.

BACKGROUND

The interior configuration, architecture, and illumination of airplanes has become relatively standardized today. The arrangement of passenger seats, passenger cabins, bulkheads, lavatories, serving areas, and the like have become developed for convenience and accommodation of both passengers and crew. The passenger compartments typically have sidewall members with a plurality of windows, a floor member and a ceiling member or assembly of some type. In addition, pluralities of rows of stowage or storage bins are positioned on the aircraft generally at the position between the sidewalls and the ceilings. For larger twin-aisle aircraft, rows of inboard stowage bins are also positioned over the seats located along the center of the passenger cabins.

The design, architecture, and lighting of the interiors of passenger aircraft, particularly the passenger cabins, have remained substantially the same for a long period of time and have not had a significant variety of changes or updates.

There continues to be a need in the aircraft industry for new and innovative solutions to passenger space, cabins, furnishings and illumination. There is also a need to change or vary the aesthetics of passenger cabins in order to improve the perception and aesthetics of the space, as well as possibly catering to the different moods of the passengers. This includes the use of changes in LED based mood lighting to emphasize the activities performed aboard an aircraft, such as boarding, resting, eating and the like.

The improvements described herein would be useful in an aircraft cabin cross bin illumination system such as described in co-pending patent application Ser. No. 11/553,725 filed Oct. 27, 2006, which is a continuation of Ser. No. 11/164,267 filed Nov. 16, 2006, now abandoned. Another example of cross bin illumination, using efficient beam forming optical light emitting diodes may be found in co-pending patent application Ser. No. 11/760,386 filed Jun. 8, 2007. Each of these applications are incorporated herein by reference.

A large number of illumination systems employ a wide variety of light emitting diode (LED) illumination systems. These include those with relatively simple beam forming optical surfaces, such as seen for example U.S. Pat. Nos. 7,083,297, 7,059,731, 6,899,443, 6,988,815, 6,896,381, 6,819,506 and 6,814,470. Other beam forming optics, with more unusual shapes, including faceted surfaces are disclosed in U.S. Pat. Nos. 7,042,655, 7,021,767, 7,006,306, 6,924,943, and 6,607,286. Also, simple strip light illumination systems are disclosed, for example in U.S. Pat. Nos. 7,114,827, 7,063, 440 and 6,609,813. All of the aforementioned U.S. patents are incorporated herein by reference.

However, none of these prior designs provide a compact illumination device combining efficient beam forming optical LEDs and prism beam turning and beam splitting arrangement for direct and indirect lighting of surfaces, as practiced in embodiments of this disclosure.

SUMMARY

A compact illumination system includes a compact illumination device placed in near proximity to the center of an illumination target area, the illumination device further has a lighting fixture; a light emitting diode attached to the lighting fixture; a beam forming optic coupled to the light emitting diode; a prism coupled to the beam forming optic, where the prism is effective for turning or splitting a beam of emitted light into a first portion of emitted light for direct lighting of an illumination target and a second portion of emitted light for indirect lighting of a second illumination target. The system and device may also include an aspheric reflector member for indirect lighting of a third illumination target. The compact illumination device is particularly useful in aircraft applications.

Aircraft can be designed with an all LED interior lighting system and this allows the aircraft manufacturer to take advantage of the unique properties of LED lighting and to make significant advances in cabin illumination capabilities compared to conventional illumination systems based on fluorescent and incandescent sources. Specifically embodiments of this disclosure use improved LED-based lighting systems to enhance the configuration, architecture, illumination and aesthetics of passenger space of the aircraft. The improved LED-based system may be an LED modified with efficient beam-forming optics and beam turning and splitting prisms, optionally additionally combined with aspheric reflecting surfaces for providing direct and indirect illumination. An important feature that has been developed to achieve these improvements is the development of cross bin lighting in which the overhead storage bins are illuminated with one color and the ceiling structure between the bins is illuminated with another color. These colors may be varied during flight, but a typical passenger-pleasing color configuration may be white light illumination for the overhead bins and blue light for the ceiling area. Another important feature of the present design is that the light sources should not generally be visible to passengers in the cabin.

Additionally, any illumination system used on an aircraft is preferably both lightweight and efficient in the use of electrical power. Illumination systems based on light emitting diodes (LEDs) offer considerable advantages over conventional fluorescent or incandescent illumination sources in this regard. These include smaller source size, lower electrical power consumption and longer operating lifetimes. However, LEDs generally emit light in a different angular pattern compared to conventional sources. The efficient use of LED illumination systems therefore requires optimization of the coupling of the LED source light output into a useful illumination beam. Embodiments of this disclosure also provide novel and efficient optical means for coupling LED light sources into useful illumination beams, which may be turned or split by prisms to provide different areas of illumination. Portions of such turned or split illuminating beams may be directed toward an aspheric reflecting surface for indirect illumination of other surfaces.

Furthermore, the need to hide a cross bin lighting system from general passenger view required that the lighting sources must be placed behind a valence or similar line of sight obstruction situated on top of the overhead bins and below a plane that extends from the top of one valence to a tangent point along the lower curve of the opposite overhead bin. The subject illumination system avoids the requirement that it be hidden behind a valence type structure.

The embodiments of the disclosure provide efficient beam forming optics, prisms and reflecting surfaces that may be placed close to the center of an aircraft ceiling structure, thereby requiring less intense lighting to either side in order to illuminate opposite positioned stowage bins.

Thus, embodiments of this disclosure utilize an improved LED illumination system with a lighting system having efficient beam-forming optics coupled to an LED source and combined with a beam turning and/or beam splitting prism to provide an efficient, compact illumination device and method.

The cross-bin illumination may be provided by a set of lights near the center of the ceiling structures which direct their illumination across the ceiling space to the opposite sets of storage/stowage bins. Some of the illumination from these lights may be directed across and under the ceiling to illuminate the storage/stowage bins (or monument or surface) located opposite from the light fixture. Typically, the color of the illumination from these lights is white but this may be changed to other colors to set specific lighting moods. A second set of lights is used to illuminate the ceiling. Typically, color of these lights is blue, but this may also be changed to set specific lighting moods. Together, the illumination from the two sets and two pairs of lights provides ceiling and cross bin illumination as necessary.

The sets or arrays of the improved LEDs with efficient beam-forming optics ande beam turning and/or splitting prisms can be positioned in various configurations. In practice an array of such compact illumination devices can run the length of an aircraft passenger cabin.

Further details, benefits and features of embodiments of this disclosure will become apparent from the following description when taken in connection with the accompanying drawings and appended claims.

BRIEF DESCRIPTION OF THE DRAWINGS

FIG. 7A is a detail of a portion of FIG. 7.

DESCRIPTION OF PREFERRED EMBODIMENTS

The need to hide aircraft cross bin lighting from general passenger view imposes restrictions on the size and placement of the light sources used for this application. Prior solutions have used lighting sources placed behind a valence situated on top of the overhead bins and below a plane that extends from the top of one valence to a tangent point along the lower curve of the opposite overhead bin.

Disclosed in detail below is an LED-based illumination system which need not be placed behind a valence near each opposite stowage bin. In fact, it may be positioned near the center of the ceiling structure and therefore closer to each bin requiring illumination. The subject design provides a significant increase in efficiency by placing the light sources nearer the respective targets.

It is known in the art of illumination system design that there is a basic relationship between the area of an illumination optic and its associated beam divergence angle. This may expressed mathematically in the form:

$$A_1 \sin^2 \theta_1 = A_2 \sin^2 \theta_2$$

where A is area of the cross section of the beam shaping optic and $\theta$ is the divergence angle. The quantity $A \sin^2 \theta$ is known variously as the etendue or Lagrange invariant. The expression means that an illumination beam with a small area cross section and a large divergence angle can only be converted into a beam with a smaller divergence angle by increasing the cross section area of the beam forming optic. This is a fundamental relationship that does not depend upon the detailed shape of the optical surfaces involved.

Figure 1:
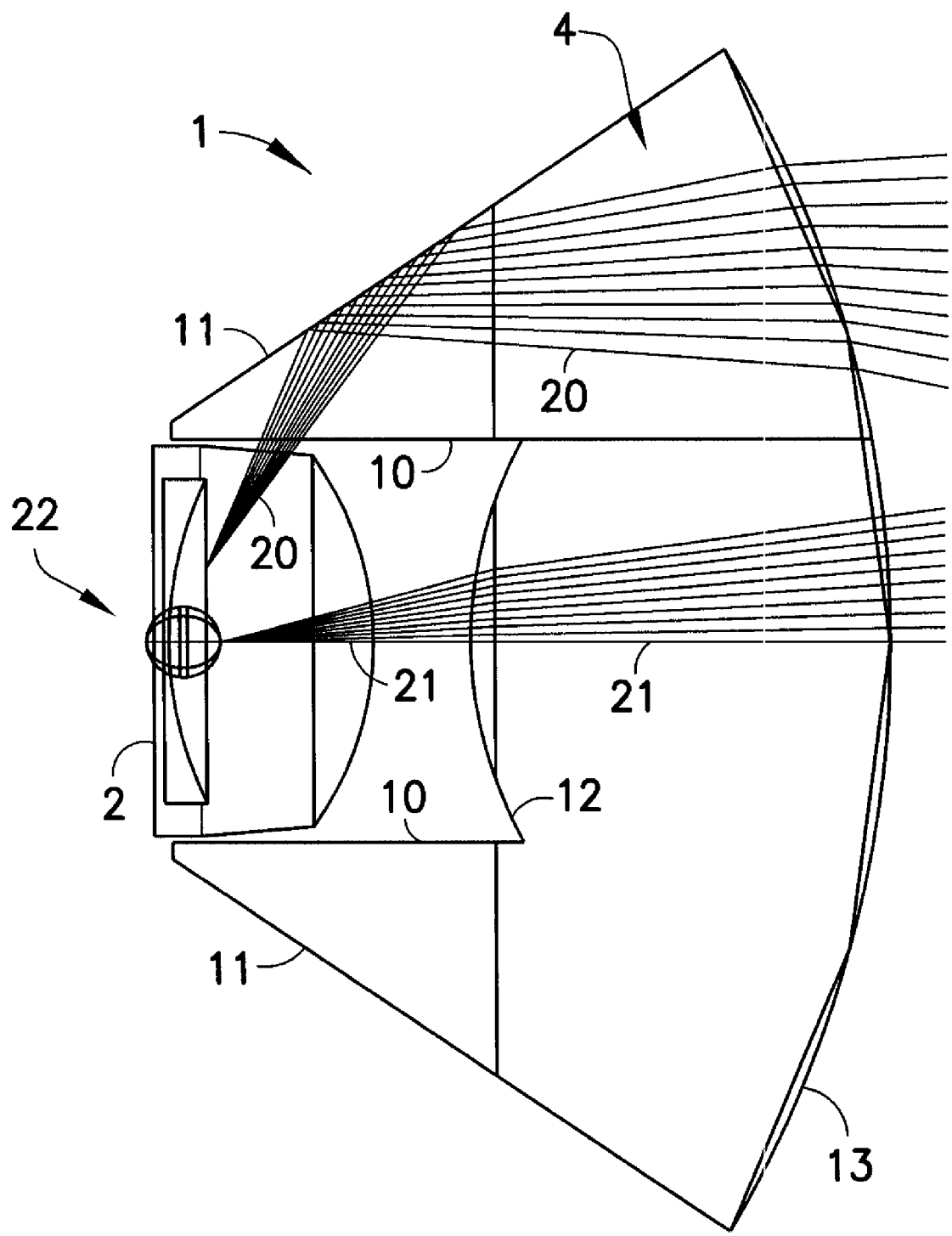
FIG. 1 is a cross section of an LED light source with efficient beam-forming optics used in one embodiment of the present disclosure.

FIG. 1 is a cross section view of an efficient beam forming optical LED device 1 which is used in accordance with the embodiments of this disclosure when combined with the additional elements described below. A beam forming optic 4 is used to collect light from an LED 2. The beam forming optic comprises a combination of optical surfaces 10, 11, 12 and 13 that act in combination to shape the beam input from LED 2. Surface 10 acts to direct a beam such as beam 20 to surface 11. Beam 20 illustrates an optical beam that is emitted by the LED at a large angle from the optical axis. Surface 11 redirects this beam 20, by means of total internal reflection to surface 13 where it is further shaped and exits the beam forming optic 4. Surface 12 acts to collect a beam, such as beam 21 from the LED and direct it to surface 13 where it is further shaped and exits the beam forming optic 4. Beam 21 illustrates an optical beam that is emitted by the LED at a narrow angle from the optical axis. Surface 12 also acts to collect light that may be reflected from surface 10 and direct it to surface 13. In this embodiment, surfaces 10 and 11 are substantially flat and oriented to form an optical wedge. Surfaces 12 and 13 are substantially cylindrical and act as lenses.

The efficient beam forming optical LED 1 may include any suitable beam shaping element 4 in which the surfaces are curved, flat or faceted. Surface 11 may also be made reflective by other means such as coating so that its shape is not limited by the need for total internal reflection. Beam forming optics for LED devices are available from a variety of commercial sources including Carclo Precision Optics which is part of the Technical Plastics Division of Carclo plc of Berkshire, England, and Polymer Optics Limited, also of Berkshire, England. Injection molded polycarbonate optics will be particularly useful in the subject aircraft illumination applications.

Beam paths 20 and 21 show light emitted by the LED at different angles from the optical axis as it exits beam forming optic 4 and which is next directed to a beam turning and/or beam splitting prism as described below in connection with further embodiments.

Figure 2:
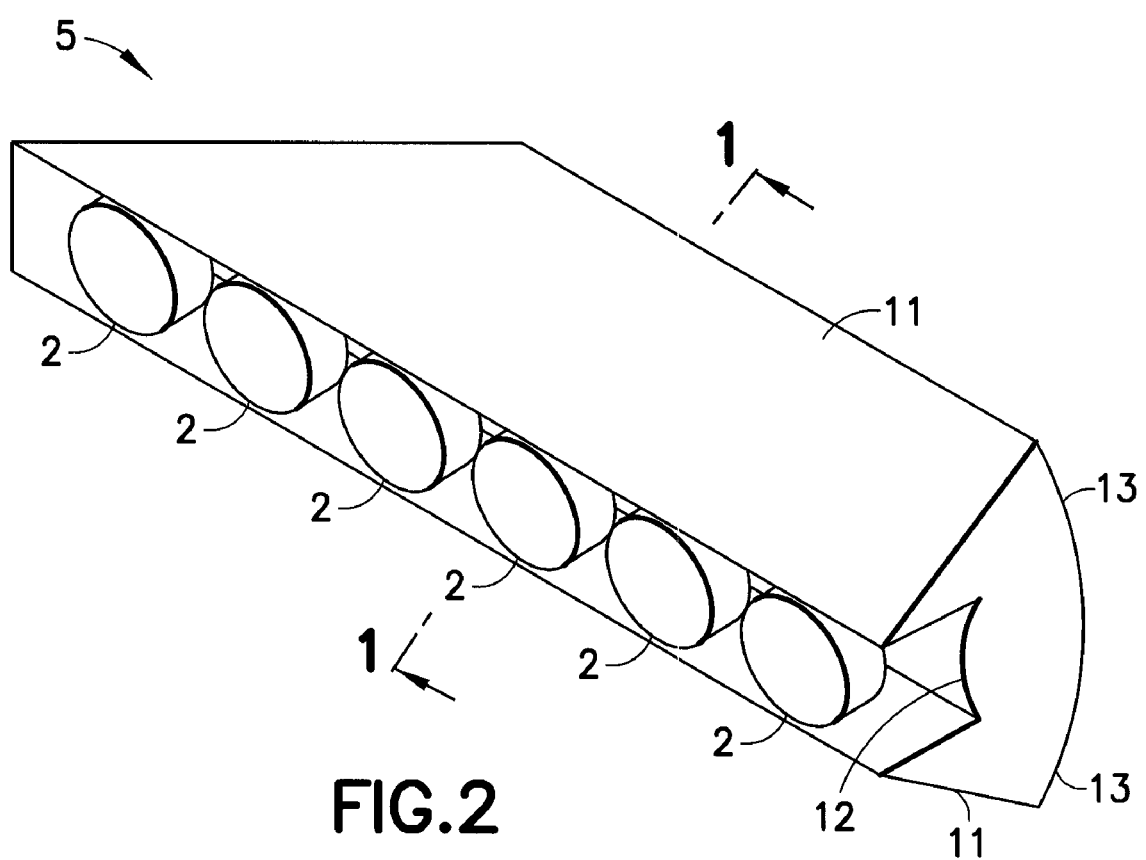
FIG. 2 is a perspective view of an array of LED's shown in FIG. 1.

FIG. 2 depicts a perspective view of an array 5 of six efficient beam-forming optical LEDs 2 of the described herein. The perspective view of FIG. 2 also shows in cross section previously described optical surfaces 11, 12 and 13.

The subject illumination system will be better understood in the context of deployment in a passenger aircraft cabin. The passenger compartments of commercial airlines today have become relatively standardized. The space in passenger cabins is quite limited due to the external fuselage size and the configuration of the airplane itself.

An aircraft passenger cabin will typically have a floor panel, a pair of sidewall members or panels, a ceiling panel or structure, and a plurality of passenger seats. As is common with larger commercial passenger airliners today, the passenger seats in each row are often arranged in three sets, with two aisles.

The exterior of the typical airplane fuselage is clad with an exterior skin which is attached to longeron and/or frames and/or bulkhead members or other structure. The longeron, frame and bulkhead members provide support and stability for the fuselage of the aircraft.

The passenger cabin has a plurality of rows of outboard storage or stowage bins, which are provided generally at the intersection of the sidewall members and the ceiling structure. If the airplane has a twin-aisle passenger cabin, rows of inboard storage bins are also provided over the central row of passenger seats. The storage/stowage bins door or bins themselves may be hinged relative to the passenger cabin such that they rotate from an up or closed position to a down or open position. The storage/stowage bins are used for storing luggage, packages, and other personal items of the passengers during flight.

The ceiling system of a two-aisle aircraft has a central structure in which the two inboard storage/stowage bins are positioned above the central section of passenger seats. The central ceiling structure may be suspended and held in place in the aircraft by conventional strut members. In one embodiment, additional ceiling structures are positioned between the central stowage bins and the two rows of outboard storage/stowage bins.

Figure 3:
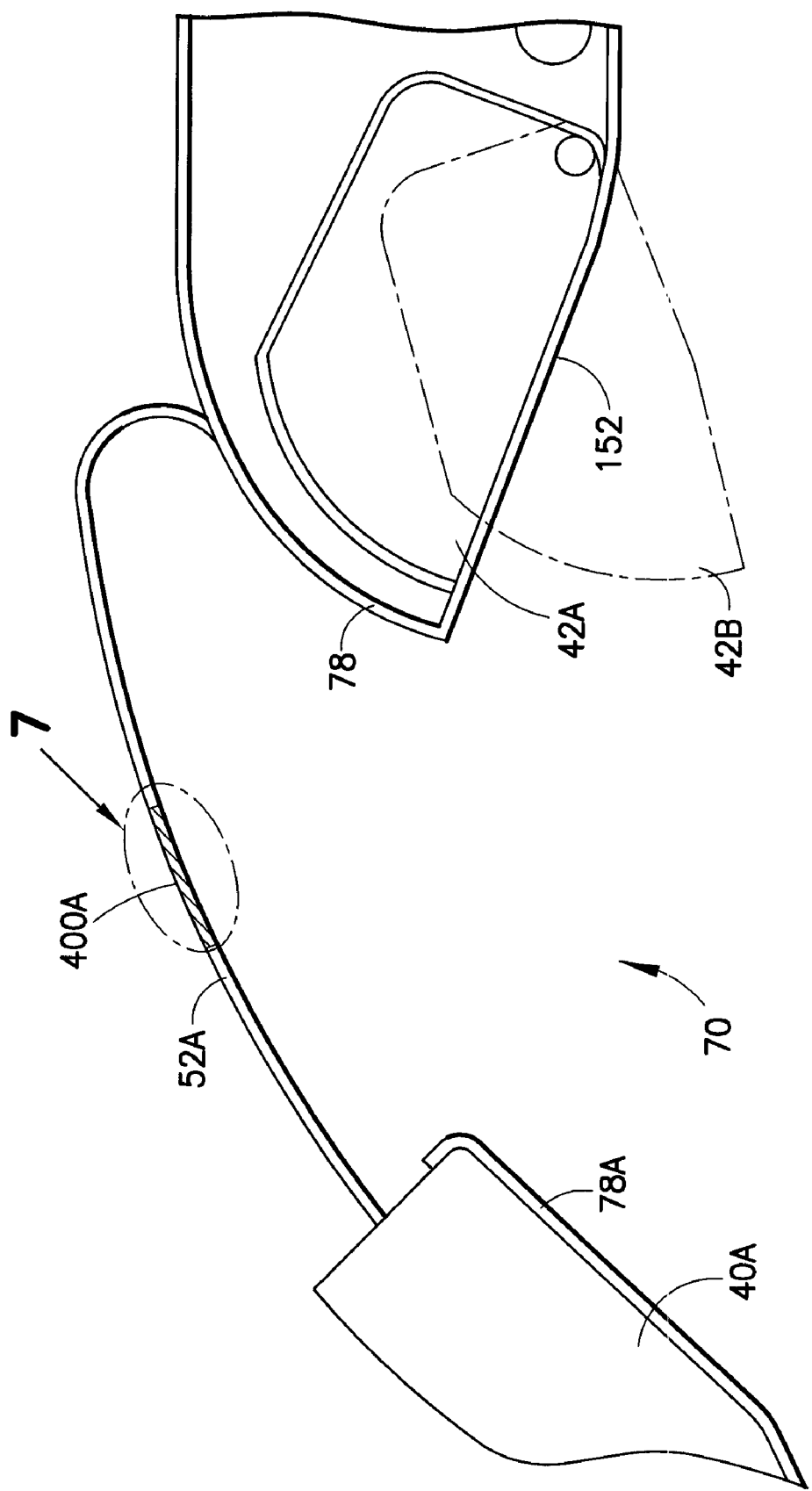
FIG. 3 is a cross section of a portion of the ceiling structure and stowage bins of an aircraft passenger cabin.

FIG. 3 is a cross section of a portion 70 of an aircraft cabin depicting two overhead bins and the ceiling area between the overhead bins. As shown more particularly in FIG. 3, an embodiment of the subject illumination system may be installed in conjunction with a ceiling panel member 52A as well as structural surfaces 78A and 78 on the outboard and inboard surfaces of the stowage/storage bins 40A and 42A, respectively. Compact illumination device 400A is seen in FIG. 3 in close proximity to the center area of ceiling structure 52A. Compact illumination device 400A is shown in further detail in FIG. 7 below. From this centralized position it is relatively simple and efficient to illuminate both opposite stowage bins 40A and 42A.

Inboard stowage bin 42A is also depicted in its lowered position 42B by the interrupted lines.

In this embodiment, the lighting sources may be the above described efficient beam-forming optical LEDs, preferably utilizing RGBW-type lighting in this application and which are directed to focus their illumination on the ceiling panel 52A. Heat sink members may be provided adjacent the lighting fixtures in order to reduce operating temperatures and extend lighting fixture service life.

The surface of the ceiling member 52A can be illuminated in any color without limitation, such as blue emulating the sky, while the rest of the area below is illuminated in white light or another light color.

Embodiments of the subject design allow directional control of the light beams within the passenger cabin, and the alternate use of colored light produces effects within the cabin which are pleasing to the passengers and also create the impression of space and height.

An LED device commonly used for the subject illumination applications is a Luxeon batwing-type LED, Model LXHL-BW02, which is a white emitter device commercially available from Phillips Lumileds Lighting Company, San Jose, Calif. The expression "batwing" refers to the typical pattern of a graph of its spatial radiation when relative intensity is plotted against angular displacement in degrees from its optical center. According to data published by the manufacturer, the LED Model LXHL-BW02 has intensity peaks near 40° angular displacement on either side of its optical axis.

When this LED is used in combination with beam forming optic 4 described in connection with FIG. 1, the wide angle light from the LED that follows beam paths such as 20 will have higher intensity than that near the optical axis, as represented by beam path 21. Multiple LED sources may be arranged along the length of the optic to produce an extended line source.

As discussed above, FIG. 1 shows a model of a typical LED coupled to a suitable beam forming optic. The lens diameter is 6 mm and the die, cup and lens of this model were configured to provide a beam angular profile shown of the batwing-type having dual maxima of relative intensities peaking at an angular displacement of about 40 and −40 degrees from its optical center. The beam forming optic has an exit height of 18 mm and a width of 11 mm. The inner cylinder radius is 6 mm and the outer cylinder lens radius is 18 mm.

Figure 4:
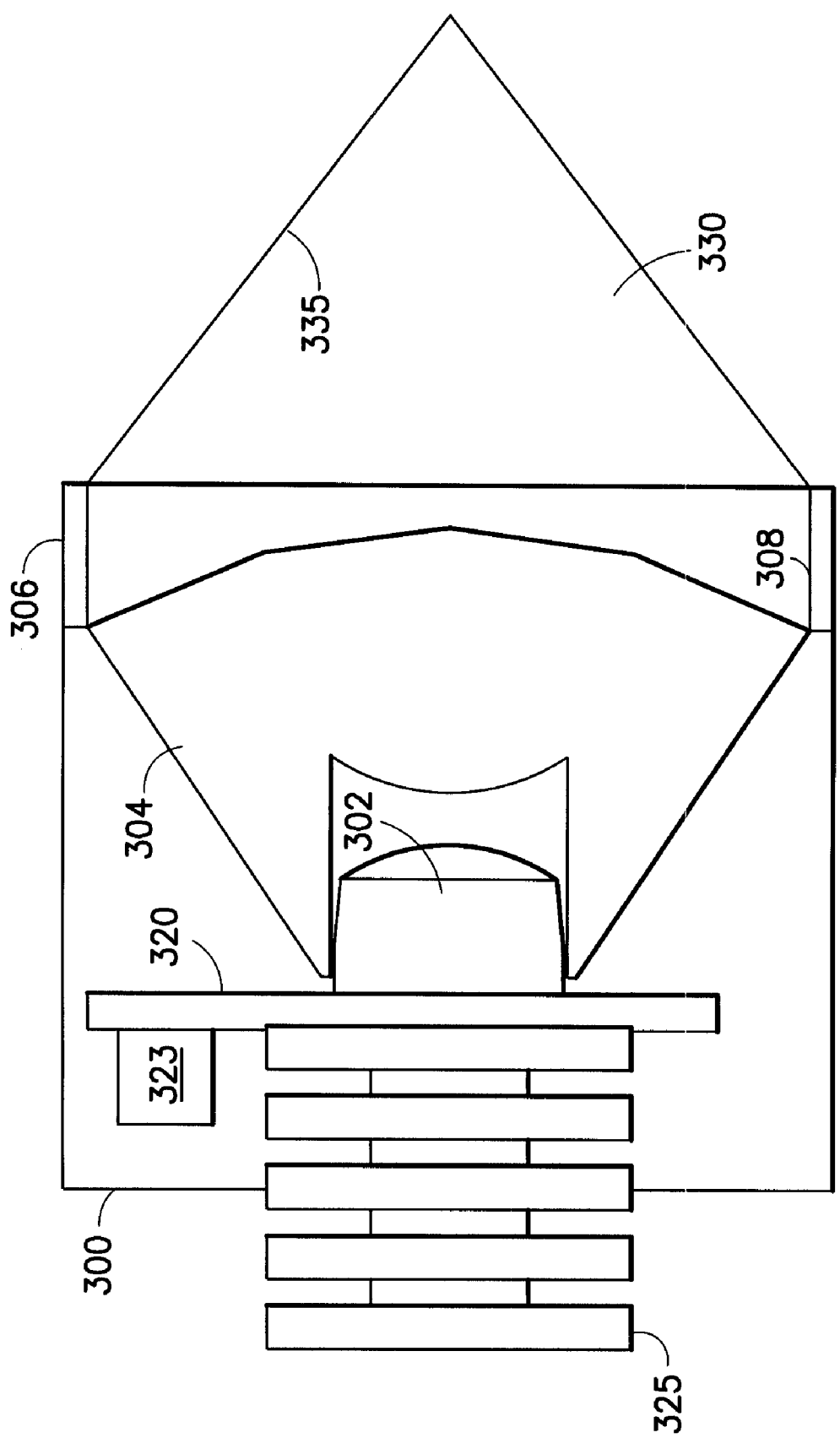
FIG. 4 is a further embodiment of the compact device for aircraft illumination.

FIG. 4 is a cross sectional view of an embodiment of the aircraft illumination system having enclosure 300 which may typically be made of aluminum or a molded engineering thermoplastic approved for use in aircraft applications. An example of the latter is polycarbonate thermoplastic. Typically the interior surfaces of the enclosure facing the LEDs will have a matte black surface. In the embodiment depicted in FIG. 4, an efficient beam forming optical LED device is comprised of light emitting diode 302, beam forming optic 304 mounted within enclosure 300 by optic mounts 306 and 308. Mounted in front of beam forming optic 304 is prism 330 having internal surfaces such as surface 335 effective for turning or splitting a beam of light emitted from LED source 202 through beam forming optic 304. Prism 330 or its optical equivalent may be mounted or optically coupled to beam forming optic 304 by conventional means. LED 302 is also mounted on a conventional power supply control board 320 which may additionally have power supply and intensity control element 323. In this embodiment, LED 302 and control board 320 are also affixed to conventional heat sink member 325.

Figure 5:
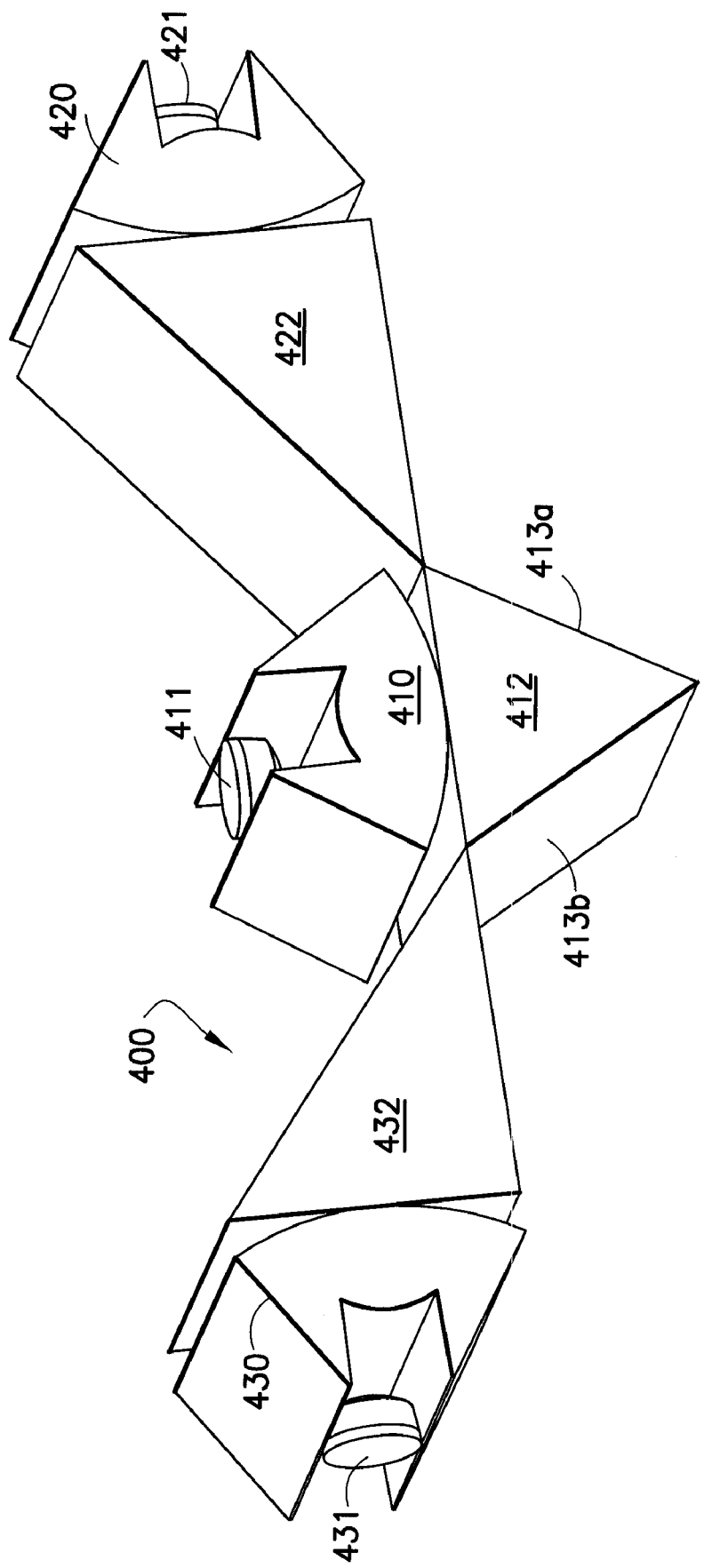
FIG. 5 is a perspective cross-section embodiment combing three of the subject compact illumination devices.

FIG. 5 illustrates an embodiment compact illumination device 400 where three lighting source assemblies are provided. In FIG. 5, LED 411 is combined with beam forming optic 410 and beam turning or splitting prism 412. Prism 412 has surfaces 413a and 413b. Symmetrically placed on either side of the central compact illumination device are another pair of such devices respectively comprising LED sources 421 and 431, beam forming optics 420 and 430, and beam turning and/or beam splitting prisms 422 and 432.

Figure 6:
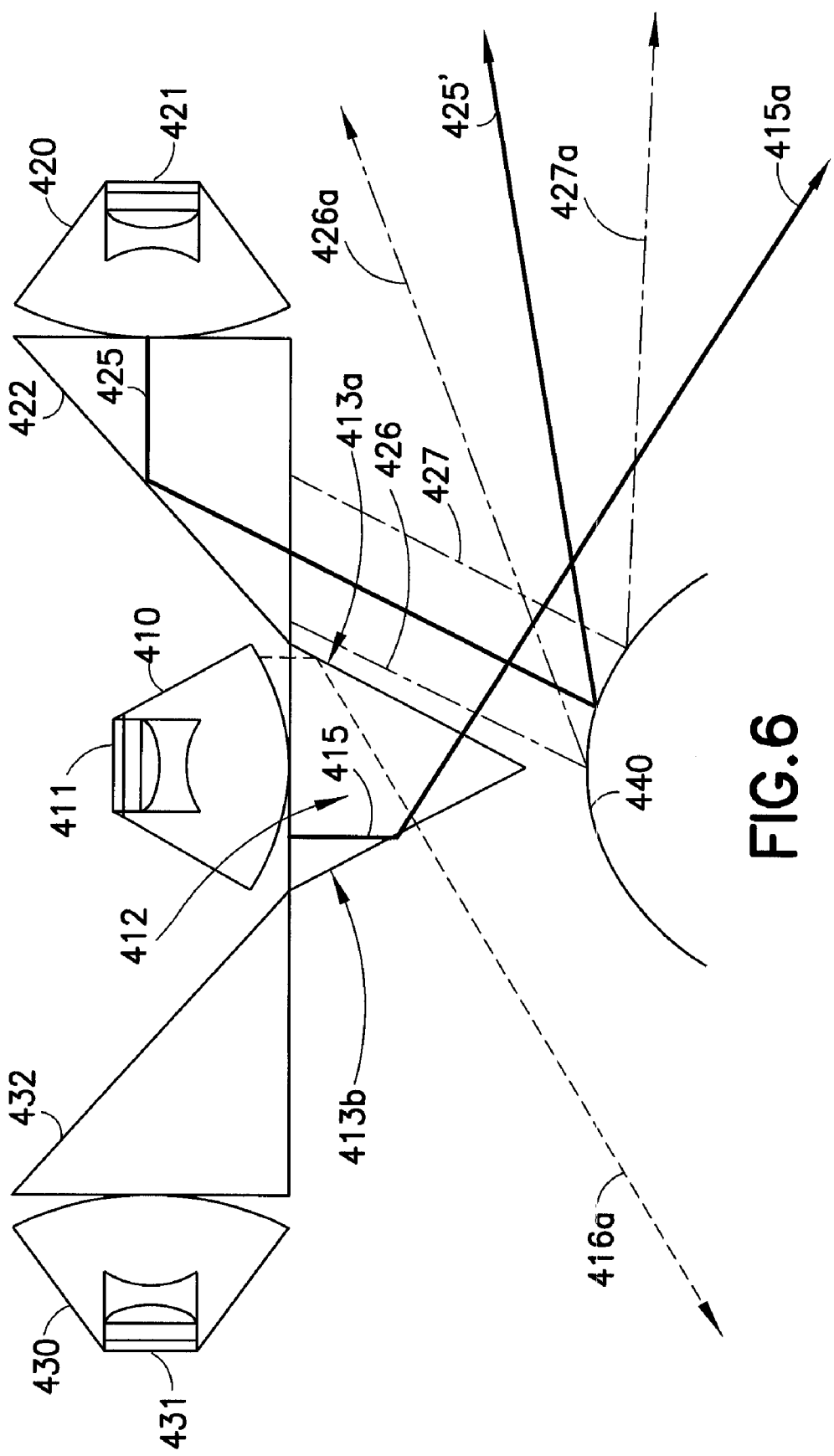
FIG. 6 is a cross section of one embodiment of the aircraft illumination system.

FIG. 6 shows the beam turning and/or beam splitting effect of the devices depicted in FIG. 5. In FIG. 6, a portion of an aspheric reflecting member 440 is shown reflecting beams of light in a variety of directions, and from several source angles. For example, beam 415 is turned within prism 412 and becomes illumination beam 415a for directly illuminating a target area. Beam 425 within prism 422 is turned toward aspheric surface 440 where it is reflected as beam 425' for indirectly lighting another target area. Additional beams 426 and 427 are depicted with reflections 426a and 427A. Exemplary direct beam 416A is shown opposite the above described beams and reflections. In a preferred embodiment of this invention, light from a line of LED sources is collected and shaped by a beam former 412. Beam 415 enters the prism 412 which has 3 faces configured to form a shape near an equilateral triangle. Half of the beam 415 strikes one prism face 413b and undergoes total internal reflection and emerges from the opposite face 413a with an orientation suitable to illuminate one bin face. Similarly, the other half of beam 415 (not shown) that strikes prism face 413a undergoes total internal reflection and emerges from face 413b with an orientation suitable to illuminate the opposite bin face. The prism faces 413a and 413b act as a compact beam splitter to split and reorient beam 415. Each face acts both as a reflector and as a window.

In the embodiment depicted in FIG. 6, placed on either side of the center light assembly are lines of LEDs 421 and 431. Light from these sources is shaped by beam formers 420 and 430. Beams 425 and 435 (not shown) so produced are turned by prisms 422 and 432 and pass along the outside of prism faces 413a and 413b. These beams then strike the beam former 440 where they are redirected to illuminate the ceiling panel. In the preferred embodiment of this invention, beam former 440 consists of one or more aspheric optical surfaces. Such surfaces are well known in the art of optical design and the use of one such aspheric surface is aspheric surface 440a illustrated in FIG. 7. The principal requirement for these surfaces is they redirect the optical beams 425 and 435 so that a uniform illumination pattern is formed on the ceiling panels of the aircraft passenger cabin. Other optical surfaces are also known that may achieve the same illumination uniformity. They include faceted surfaces, scattering surfaces and combinations thereof. Any combination of surface that achieves the desired illumination pattern may be used in this invention.

Figure 7:
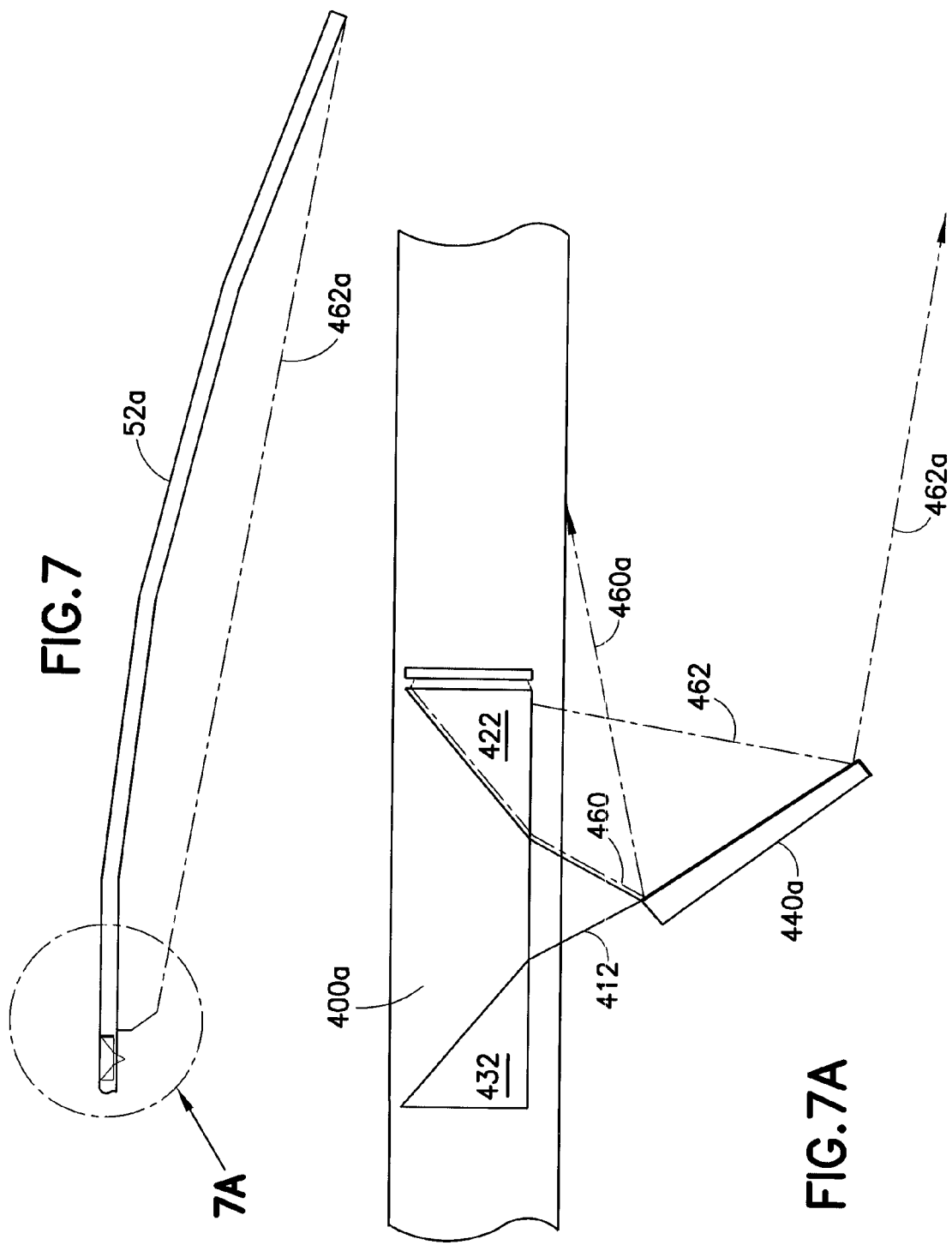
FIG. 7 is a detail of an aircraft ceiling structure and the compact illumination system.

FIG. 7 is a cross-section of a portion of ceiling panel 52A having an embodiment of the subject compact illumination device within circle 7A which is shown in further detail in FIG. 7A. Also shown is illumination beam 462A. In the preferred embodiment of this invention, the illumination source is located near the center of the aircraft ceiling panel 52A and the illumination pattern so produced is approximately symmetric. Other arrangements where illumination source is not centrally located and/or the beams are not substantially symmetric are also within the scope of this invention. The invention may also be configured to illuminate a single bin and two ceiling panels or a single bin and one ceiling panel. The central and side illumination sources may also be separated and used independently of each other.

Figure 8:
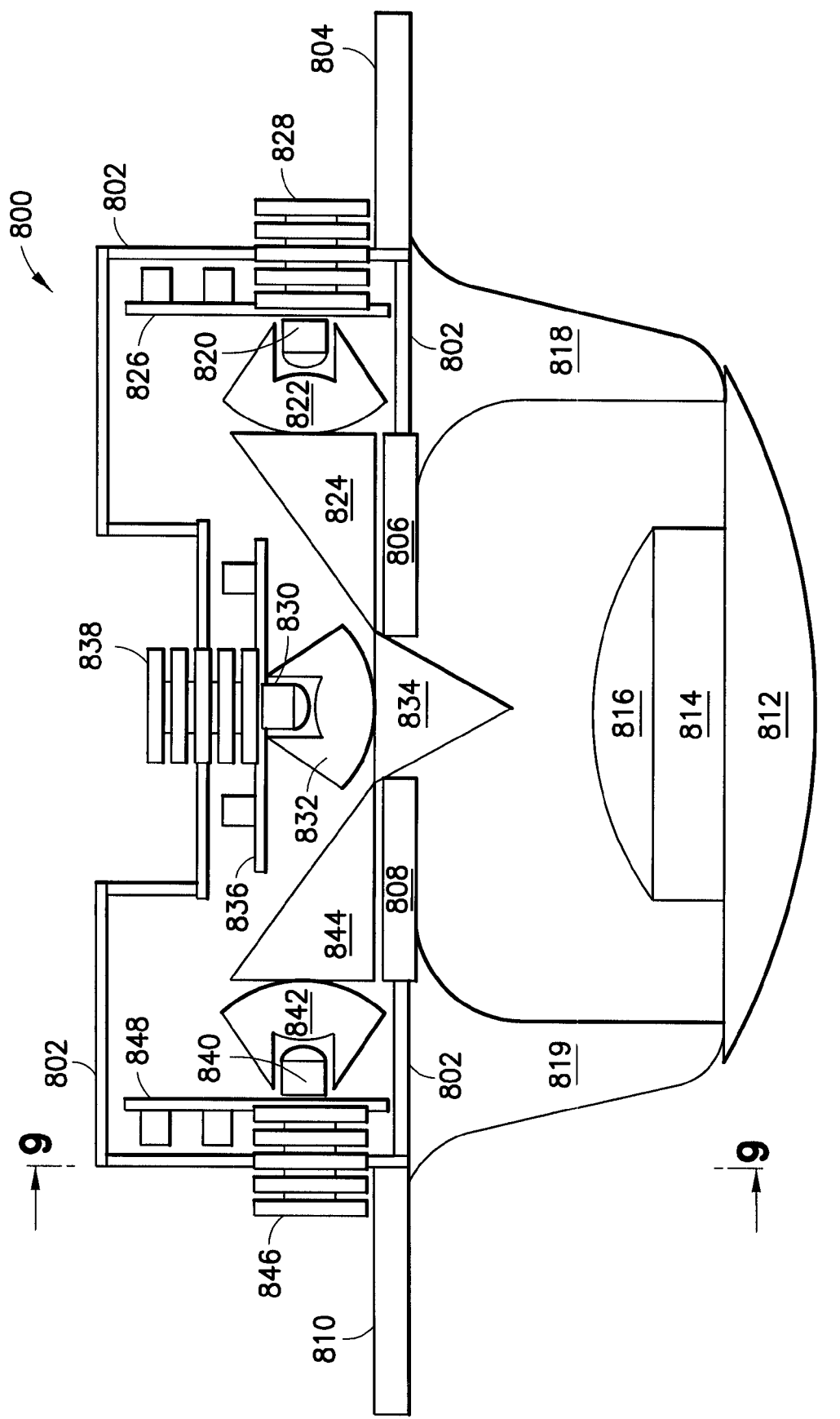
FIG. 8 is a cross section of another embodiment of the illumination system.

In FIG. 7A, compact illumination device 400A having three prisms 412, 422 and 432. Illumination beam 460 is reflected upwardly by aspheric surface 440A whereby reflected beam 460A is aimed at ceiling surface 52A. Second illumination beam 462 strikes a different point on aspheric surface 440A and is reflected at a relatively lower angle as illumination beam 462A FIG. 8 is a an embodiment of the present design showing compact illumination system 800 in an aircraft application. System 800 has enclosure 802 within which is a central LED subassembly 830 which is symmetrically flanked by LEDs 820 and 840. Each of these subassemblies has, respectively, beam forming optics 822, 832 and 842, turning and/or splitting prisms 824, 834 and 844, power and control circuit boards 826, 836 and 848, heat sinks 828, 838 and 846. Aircraft ceiling structural members 804, 806, 808 and 810 retain the assembly in proximity to the ceiling or surface to be illuminated. Additional structural support struts 818 and 819 which support lower ceiling segment 812. In FIG. 3, lower ceiling segment 812 has a spacer 814 upon which is aspheric spreader optic 816.

Figure 9:
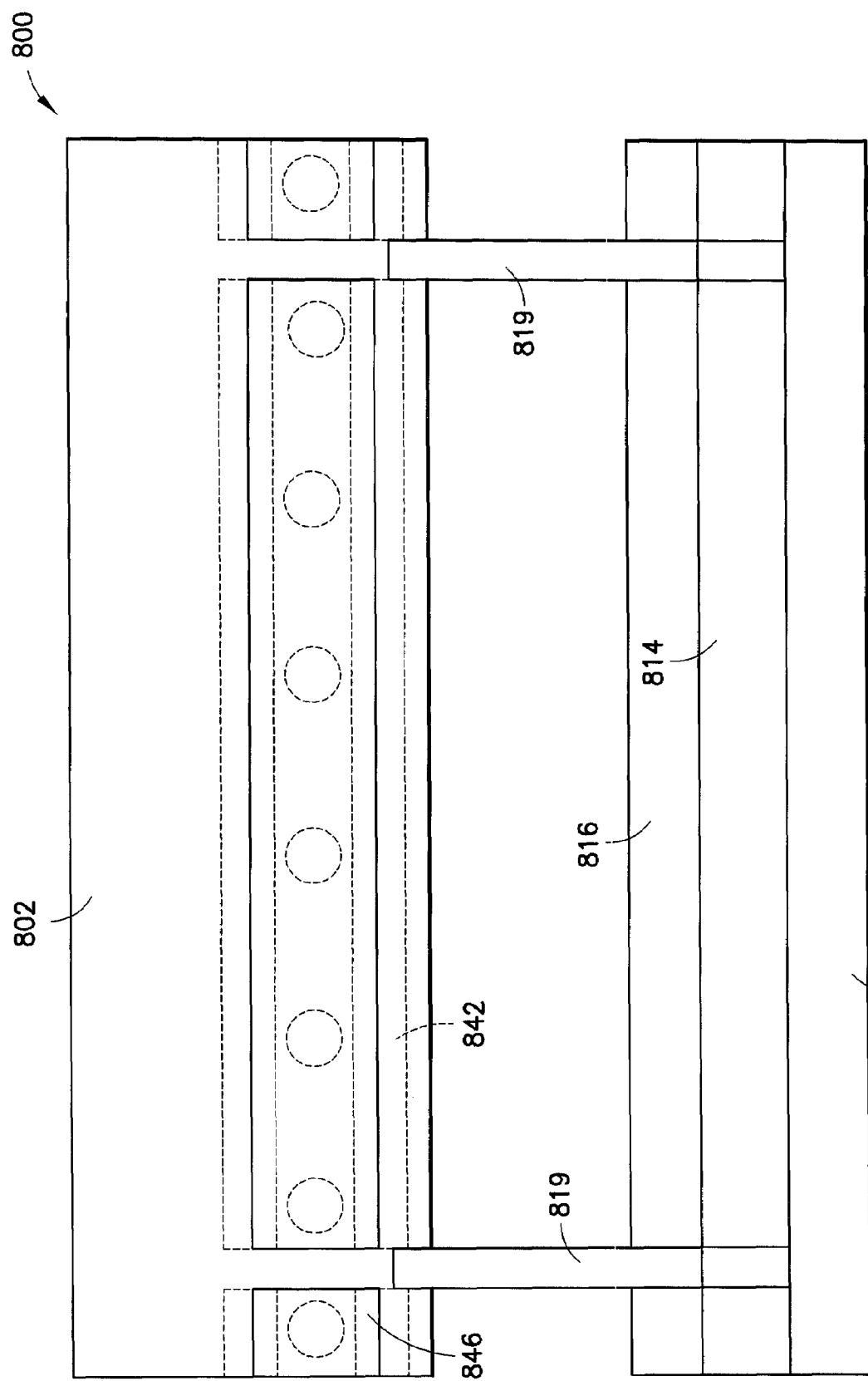
FIG. 9 is a lateral view of one embodiment of the illumination system.
Figure 10:
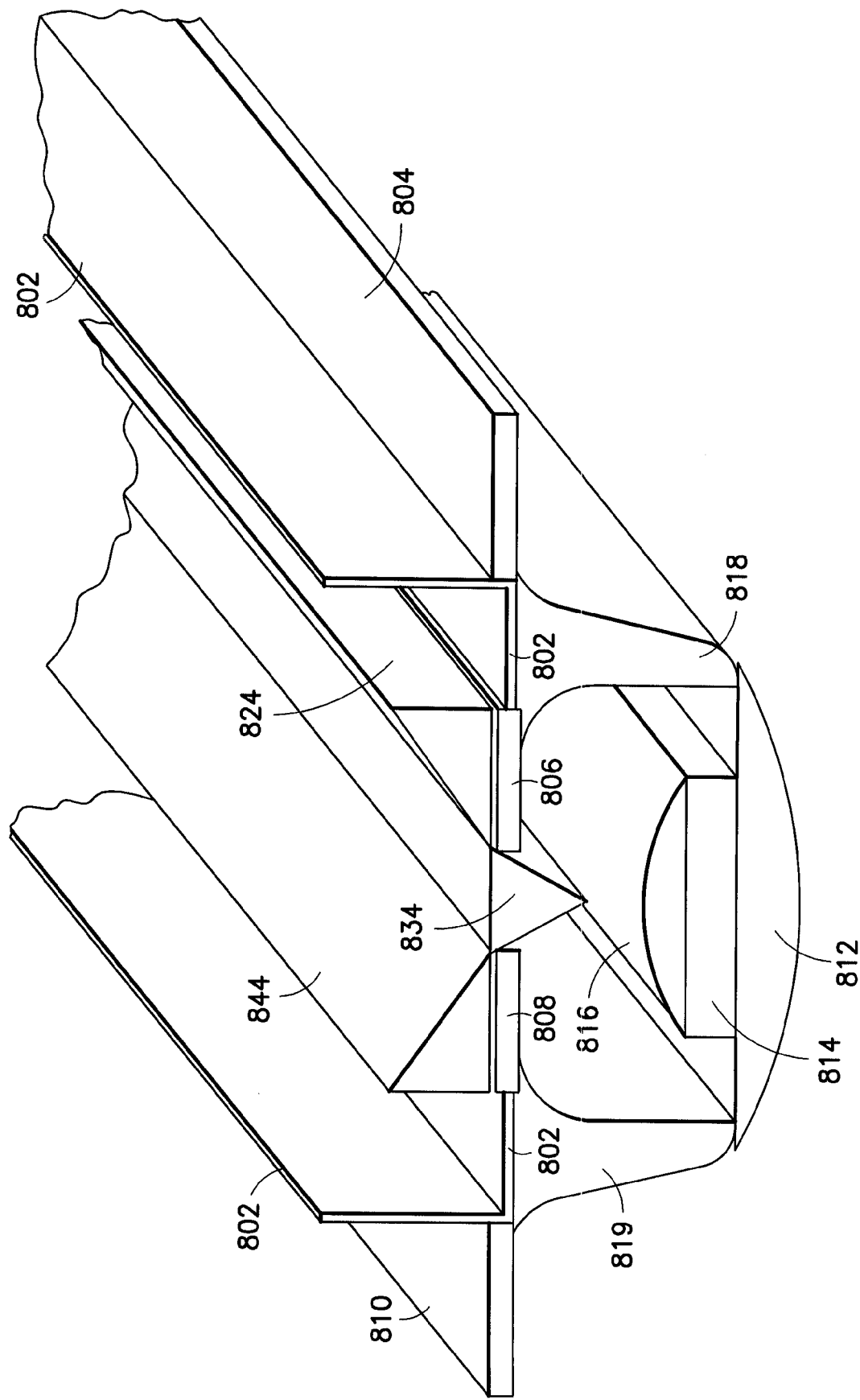
FIG. 10 is a perspective view of an embodiment of the illumination system.

FIG. 9 is a lateral view of an embodiment of the illumination system in an aircraft application and FIG. 10 is a perspective view of such an application. In these figures, all reference numbers correspond to previously described parts of the design.

Figure 11:
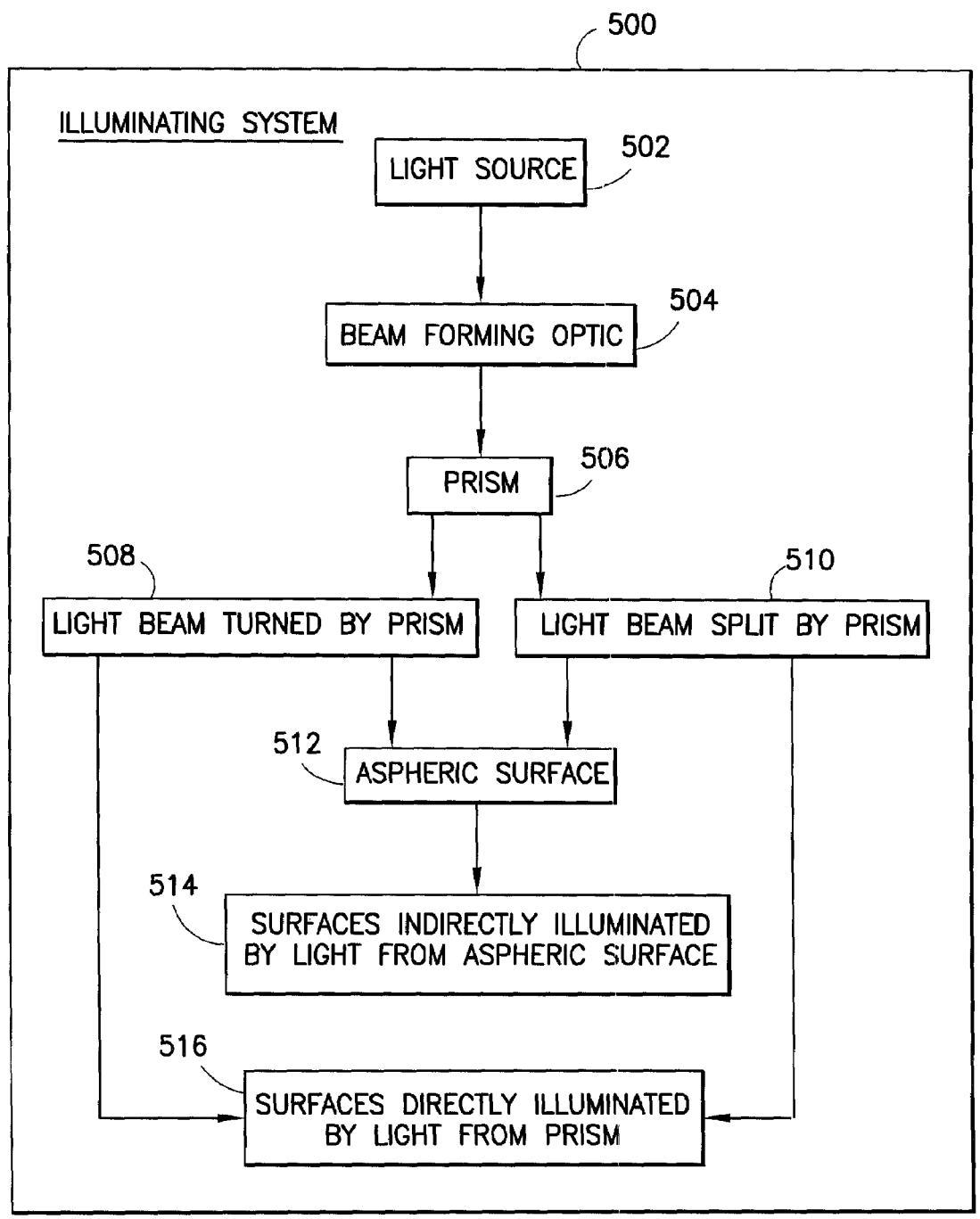
FIG. 11 is a schematic diagram of the illumination system.

FIG. 11 is a schematic representation of an embodiment of aircraft cross bin illumination system 500, wherein light source 502 directs light to beam forming optic 504 which directs it to beam turning and/or beam splitting prism 506. A first portion of light turned by prism 506 is emitted as beam 508 for directly illuminating surface 516. A second portion of light split by prism 506 is also emitted as a direct beam 510 of directly illuminating surface 516. Other portions of turned or split light are directed first to an aspheric surface 512 for indirectly illuminating surfaces 514.

While the compact illumination device and system has been described in connection with one or more embodiments, it is to be understood that the specific mechanisms and techniques which have been described are merely illustrative and numerous modifications may be made to the methods and apparatus described without departing from the spirit and scope of the improvements defined by the appended claims.

What is claimed is:

1. An illumination system for a ceiling structure of an airplane having at least a first row of stowage bins adjacent said ceiling structure, said illumination system comprising:
   a. a compact illumination device placed in near proximity to the center of said ceiling structure and opposite said first row of stowage bins, said illumination device further comprising a lighting fixture;
   b. a light emitting diode attached to said lighting fixture;
   c. a beam forming optic coupled to said light emitting diode;
   d. a first prism coupled to said beam forming optic, said first prism effective for turning or splitting a beam of emitted light into a first portion of emitted light for direct lighting of an illumination target and a second portion of emitted light for direct lighting of a second illumination target,
   e. a second prism effective for directing a third portion of light from a second beam forming optic toward an aspheric surface, the aspheric surface effective for reflecting said third portion of emitted light for indirect lighting of a third illumination target.

2. The illumination system of claim 1 comprising a plurality of said compact illumination devices.

3. The illumination system of in claim 1 where said illumination targets are aircraft cabin surfaces.

4. The system of claim 1 wherein a plurality of said devices are arranged in a longitudinal array for the illumination of an aircraft cabin.

5. The illumination system of claim 1 further comprising a heat sink member attached to the lighting fixture for extending the operational life of the device.

6. The illumination system of claim 1 further comprising power supply and control means integrated with the illumination device.

7. The illumination system of claim 1 wherein said illumination target is the stowage bin.

8. The illumination system of claim 7 wherein said third illumination target is the ceiling structure.

9. The illumination system as described in claim 1 wherein said ceiling structure has a curved configuration.

10. The illumination system as described in claim 1 wherein additional lighting devices direct light to the ceiling structure.

11. The illumination system as described in claim 1 further comprising a light source having a blue color.

12. The illumination system as described in claim 1 wherein the light emitting diode is selected from the group consisting of white LED lights, RGB LED lights and RGBW LED lights.

13. The illumination system as described in claim 1 wherein said lighting fixture comprises a plurality of LED lights.

14. A method for illuminating the ceiling structure of an airplane having at least a first row of stowage bins adjacent said ceiling structure, said method comprising:
   a. placing an illumination device adjacent said ceiling structure and between two opposite rows of stowage bins, said illumination device further comprising a lighting fixture;
   b. attaching a first light emitting diode to said lighting fixture;
   c. coupling a first beam forming optic to said first light emitting diode;
   d. coupling a first prism to said first beam forming optic, said first prism effective for turning or splitting a beam of emitted light into a first portion of emitted light for direct lighting of an illumination target and a second portion of emitted light for direct lighting of a second illumination target;
   e. coupling a second prism to a second beam forming optic and directing a third portion of emitted light from the second beam forming optic to an aspheric reflector member effective for indirect lighting of additional illumination targets.

15. A compact illumination system comprising:
   a. a compact illumination device placed in near proximity to the center of an illumination target area, said illumination device further comprising a lighting fixture;
   b. a light emitting diode attached to said lighting fixture;
   c. a first beam forming optic coupled to said light emitting diode;
   d. a first prism coupled to said first beam forming optic, said first prism effective for turning or splitting a beam of emitted light into a first portion of emitted light for direct lighting of an illumination target and a second portion of emitted light for direct lighting of a second illumination target;
   e. a second prism connected to a second beam forming optic, said second prism effective for directing a third portion of light from the second beam forming optic toward an aspheric surface; and an aspheric reflector member for indirect lighting of a third illumination target.

* * * * *